United States Patent
Tao et al.

(10) Patent No.: US 7,491,264 B2
(45) Date of Patent: Feb. 17, 2009

(54) OXYGEN CONCENTRATING APPARATUS

(75) Inventors: Shinichi Tao, Tokyo (JP); Yoshinobu Kimura, Tokyo (JP); Satoshi Inomoto, Yamaguchi (JP)

(73) Assignee: Teijin Pharma Limited, Tokyo (JP)

( * ) Notice: Subject to any disclaimer, the term of this patent is extended or adjusted under 35 U.S.C. 154(b) by 422 days.

(21) Appl. No.: 10/582,879

(22) PCT Filed: Feb. 15, 2005

(86) PCT No.: PCT/JP2005/002671

§ 371 (c)(1),
(2), (4) Date: Jun. 14, 2006

(87) PCT Pub. No.: WO2005/077824

PCT Pub. Date: Aug. 25, 2005

(65) Prior Publication Data

US 2007/0163441 A1    Jul. 19, 2007

(30) Foreign Application Priority Data

Feb. 16, 2004  (JP)  ............................. 2004-037831

(51) Int. Cl.
*C01B 13/02*  (2006.01)
*B01D 53/04*  (2006.01)
(52) U.S. Cl. .................... 96/121; 128/205.12
(58) Field of Classification Search .......... 96/121; 95/130; 128/204.18, 205.12, 205.27
See application file for complete search history.

(56) References Cited

U.S. PATENT DOCUMENTS 4,342,573 A * 8/1982 McCombs et al. ............ 96/109
4,378,982 A   4/1983 McCombs
4,511,377 A * 4/1985 McCombs .................... 96/143
5,730,778 A * 3/1998 Hill et al. ...................... 95/12

(Continued)

FOREIGN PATENT DOCUMENTS

EP    1481703 A    12/2004

(Continued)

OTHER PUBLICATIONS

International Search Report, mailed May 2005.

*Primary Examiner*—Frank M Lawrence
(74) *Attorney, Agent, or Firm*—Rader, Fishman & Grauer, PLLC

(57) ABSTRACT

An oxygen concentrating apparatus (10) has an oxygen concentrating unit (12), a compressor (26) for supplying compressed air to the oxygen concentrating unit (12) and a compressor housing (28) for accommodating the compressor (26). The compressor housing (28) includes a plurality of air inlet ports (28a) for introducing the air into the compressor housing (28) and an air outlet opening (28b) for discharging the air from the compressor housing (28). A cooling fan (30) is mounted on the compressor housing (28) at the air outlet opening (28b) for drawing the air from the compressor housing (28). The air inlet ports (28a) are disposed adjacent to the side wall of the compressor (26) to direct the air flow induced by the cooling fan perpendicularly to the side wall of the compressor (26). The capacity of the cooling fan (30) and the diameter of the air inlet ports (28a) are selected to ensure the velocity of the air flow through the air inlet ports (28a) is equal to or lower than 15 m/sec.

5 Claims, 5 Drawing Sheets

U.S. PATENT DOCUMENTS

| | | | | |
|---|---|---|---|---|
| 6,068,680 A | * | 5/2000 | Kulish et al. | 95/98 |
| 6,302,107 B1 | * | 10/2001 | Richey et al. | 128/205.18 |
| 2005/0103341 A1 | * | 5/2005 | Deane et al. | 128/204.26 |

FOREIGN PATENT DOCUMENTS

| | | |
|---|---|---|
| JP | 62-140619 A | 6/1987 |
| JP | 62-218502 A | 9/1987 |
| JP | 63-218502 A | 9/1988 |
| JP | 2003-246607 A | 9/2003 |
| WO | WO-03/074113 A | 9/2003 |
| WO | WO-03/090903 A | 11/2003 |

* cited by examiner

OXYGEN CONCENTRATING APPARATUS

TECHNICAL FIELD

The present invention relates to an oxygen concentrating apparatus including a cooling device for a compressor which supplies compressed air to a plurality of adsorption columns filled with an adsorbent such as zeolite.

BACKGROUND ART

Oxygen inhalation therapy has been employed as a most effective method of treatment for respiratory system diseases such as asthma, pulmonary emphysema or chronic bronchitis. In oxygen inhalation therapy, an oxygen concentrated gas is supplied to the patient. For this purpose, package-type oxygen concentrating apparatuses have been developed for use in the home. The package-type oxygen concentrating apparatus includes an oxygen concentrating unit for producing oxygen gas by separating nitrogen gas from the air, a compressor for supplying compressed air to the oxygen concentrating unit and a case for accommodating the oxygen concentrating unit and the compressor in order to insulate the noise. Japanese Unexamined Patent Publications (Kokai) No. 62-140619 and No. 63-218502 disclose examples of such apparatuses.

DISCLOSURE OF THE INVENTION

Recently, some oxygen concentrating apparatus further include a compressor housing, disposed in the case, for accommodating the compressor in order to minimize the noise emission from the apparatus. However, the compressor housing prevents the compressor, disposed therein, from being cooled.

Therefore, the objective of the invention is to provide an oxygen concentrating apparatus improved to efficiently cool the compressor disposed in the compressor housing while an increase in the weight of the apparatus is minimized.

According to the invention, there is provided an oxygen concentrating apparatus which comprises an oxygen concentrating unit, including an adsorption column filed with an adsorbent material which selectively adsorbs nitrogen gas more than oxygen gas, a compressor for supplying compressed air to the oxygen concentrating unit, a compressor housing for accommodating the compressor, the compressor housing including a plurality of air inlet ports for introducing the air into the compressor housing and an air outlet opening for discharging the air from the compressor housing, a cooling fan mounted on the compressor housing at the air outlet opening for drawing the air from the compressor housing and the air inlet ports being disposed adjacent the side wall of the compressor to direct the air flow induced by the cooling fan perpendicularly to the side wall of the compressor. The capacity of the cooling fan and the diameter of the air inlet ports are selected to ensure that a velocity of the air flow through the air inlet ports is equal to or lower than 15 m/sec.

BEST MODE FOR CARRYING OUT THE INVENTION

Figure 1:
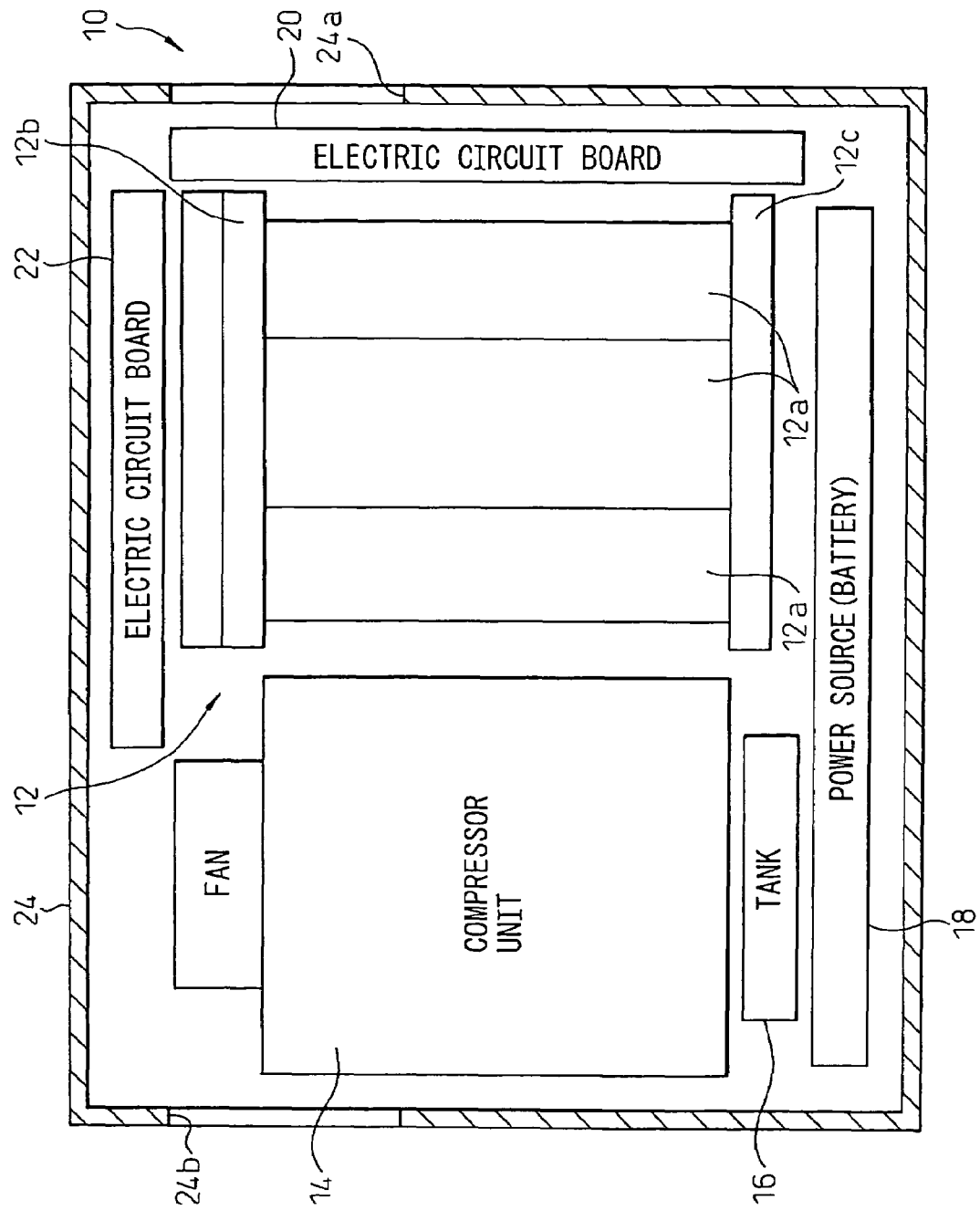
FIG. 1 is a diagrammatic section of an oxygen concentrating apparatus according to an embodiment of the present invention.
Figure 2:
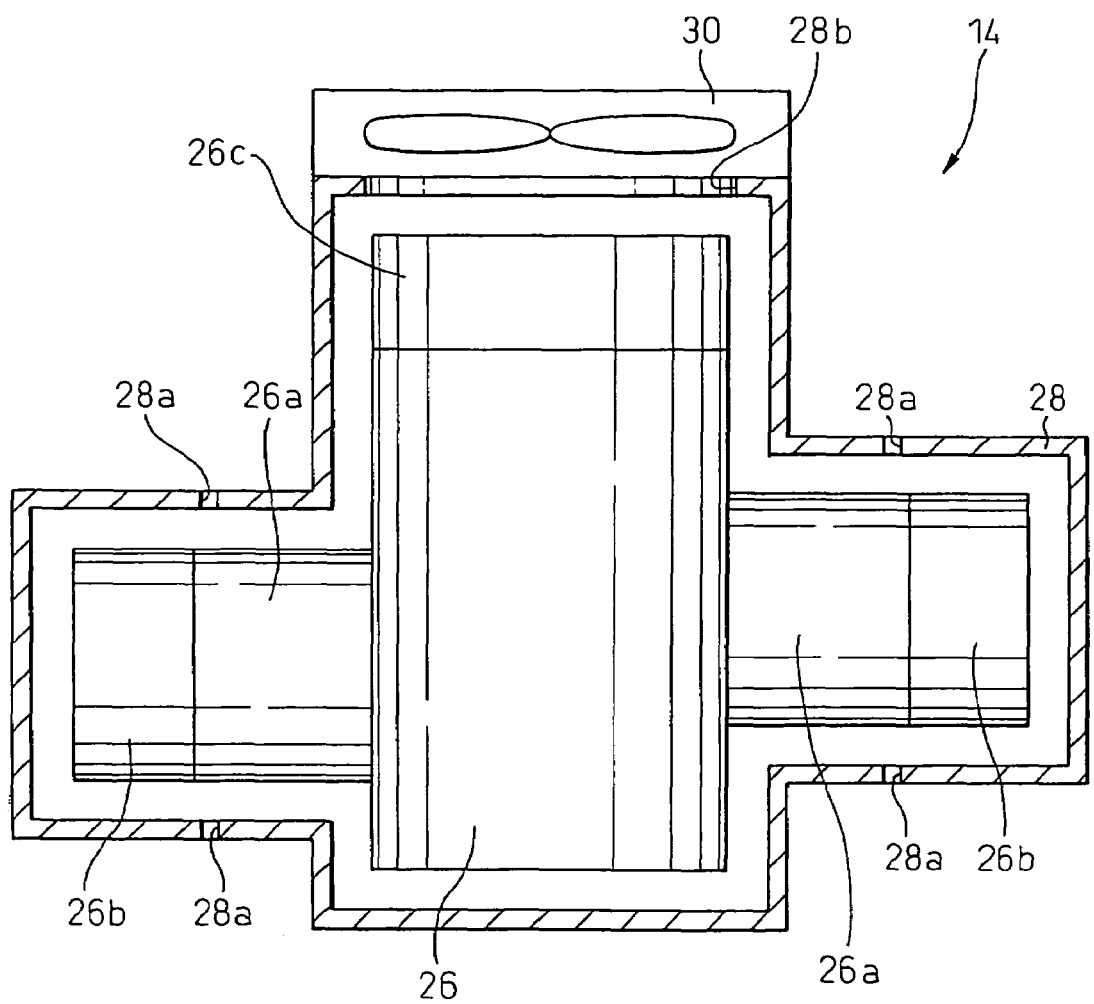
FIG. 2 is a diagrammatic section of a compressor used in the oxygen concentrating apparatus shown in FIG. 1.

With reference to FIGS. 1 and 2, a preferred embodiment of the present invention will be described below.

An oxygen concentrating apparatus 10 according to the embodiment of the invention includes an oxygen concentrating unit 12, a compressor unit 14 for supplying the compressed air to the oxygen concentrating unit 12, a tank 16 for containing the oxygen concentrated gas from the oxygen concentrating unit 12, a battery as an electric power source 18 for the oxygen concentrating unit 12 and the compressor unit 14, electric circuit boards 20 and 22 for controlling the oxygen concentrating unit 12 and the compressor unit 14, and a case 24 accommodating all of the above elements 12-22. The oxygen concentrating apparatus 10 further includes a plurality of conduits or pipes (not shown) for fluidly connecting the oxygen concentrating unit 12, the compressor unit 14 and the tank 16. The case 24 includes an air inlet opening 24a, through which the air is introduced into the case 24, and a gas outlet opening 24b through which the nitrogen gas, separated from the air by the oxygen concentrating unit 12, is exhausted.

Preferably, the oxygen concentrating unit 12 may comprise a pressure swing type gas separator. In this particular embodiment, the oxygen concentrating unit 12 includes a plurality of adsorption columns 12a filled with an adsorbent such as zeolite which selectively adsorbs nitrogen gas more than oxygen gas. The oxygen concentrating unit 12 further includes switching mechanisms 12b and 12c for sequentially selectively switching the adsorption columns to which the air is supplied from the compressor unit 14, and the adsorption columns from which the absorbed nitrogen is released, for regeneration of the adsorbent so that the respective adsorption columns repeatedly absorb nitrogen gas and release the absorbed nitrogen gas according to an absorption-regeneration cycle.

With reference to FIG. 2, the compressor unit 14 includes a compressor 26, a compressor housing 28, made of a suitable material, for example, a synthetic resin, such as NBR (acrylonitrile-butadiene rubber), to accommodate the compressor 26 and to provide noise insulation, and a cooling fan 30. The housing 28 has a foamed polyurethane linear attached to the inner surface thereof as a noise insulating material. The compressor 26 may comprise any type of compressor, such as a reciprocating compressor and a rotary compressor. In the embodiment of FIG. 2, the compressor 26 is a reciprocating compressor and is, for example, a Horizon Model 2250 pressure/vacuum pump, available from Rietschle Thomas, 7222-T Parkway Dr., Hanover, Md. The compressor has cylinders 26a within which pistons (not shown) are slidably disposed, cylinder heads 26b attached to the ends of the cylinders 26a and a diving motor 26c. The output shaft of the driving motor 26c is connected to a crank shaft (not shown) to which the pistons are connected through connection rods so that the rotation of the driving motor 26c is transformed to the reciprocation of the pistons.

The compressor housing 28 preferably has a configuration similar to the exterior configuration of the compressor 26 to efficiently pass the air along the surface of the compressor 26. The compressor housing 28 includes a plurality of air inlet ports 28a, an air outlet opening 28b and at least side walls facing the cylindrical side walls of the cylinders 26a and defining the inlet ports 28a. A cooling fan 30 is mounted on the compressor housing 28 at the air outlet opening 28b. In this particular embodiment, the housing 28 includes twenty-eight (28) air inlet port 28a having diameter of 6 mm. The air inlet ports 28a are disposed around the cylinders 26a to direct the air flow, induced by the cooling fan 30, through the air inlet ports 28a perpendicularly to the outer surfaces of the cylinders 26a adjacent the ends thereof where the temperature of the air in the cylinders 26a is increased by the compression of the air and the friction between the pistons and the inner surfaces of the cylinders 26a. This configuration allows the air flow to impinge against the outer surfaces of the cylinders 26a and to increase the cooling effect of the air flows. The air introduced into the compressor housing 28 through the air inlet ports 28a is exhausted into the case 24 through the air outlet opening 28b.

With reference to FIGS. 3-7, the effect of the present invention will be described below.

Figure 3:
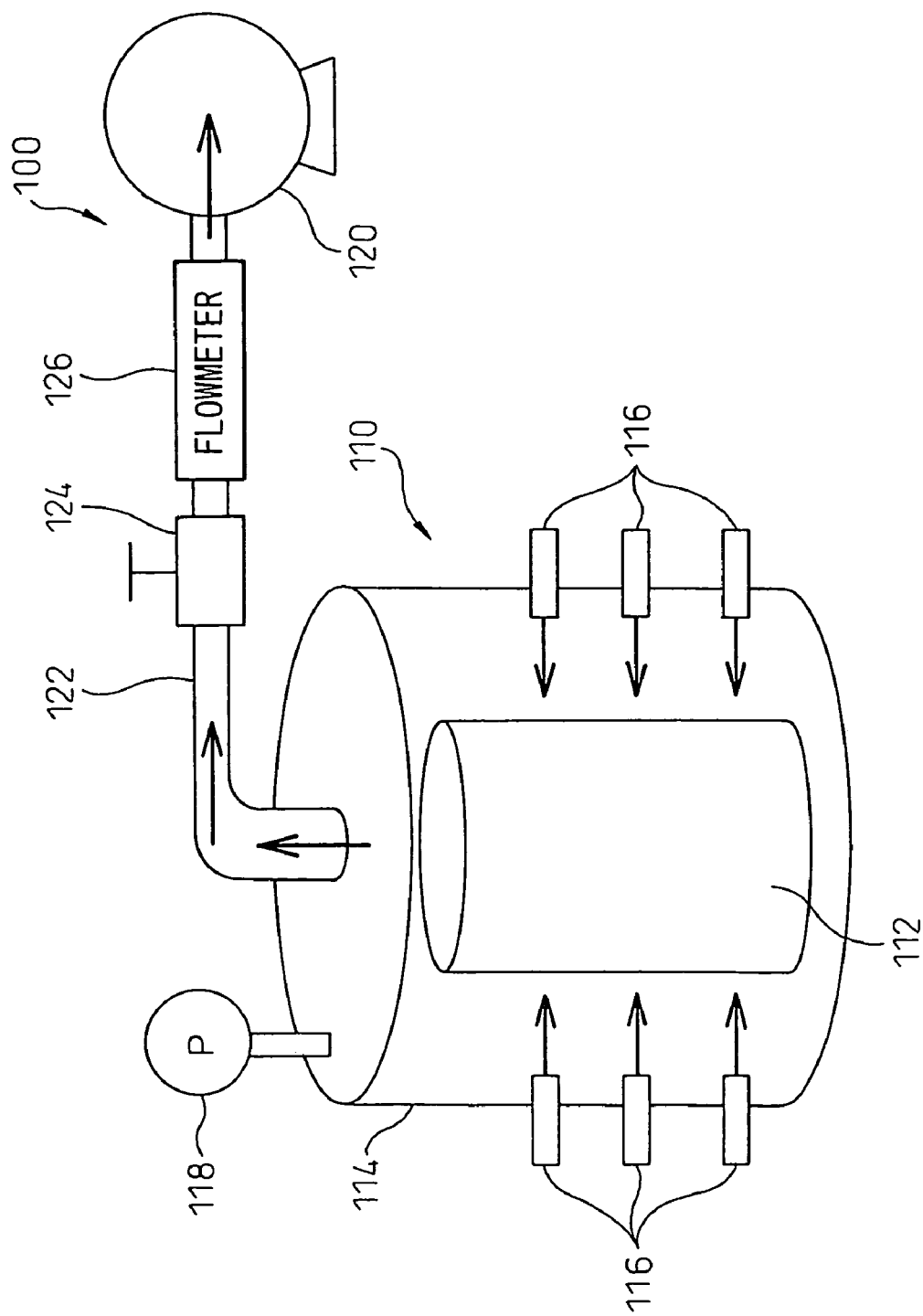
FIG. 3 is a block diagram of an experimental apparatus used to determine the effect of the present invention.

FIGS. 4-7 are graphs showing experimental results obtained by using the apparatus of FIG. 3. In FIG. 3, an experimental apparatus 100 has a dummy compressor unit 110 and a vacuum pump 120 fluidly connected to the dummy compressor unit 110 through a conduit 122. The dummy compressor unit 110 includes a heater unit 112, having a cylindrical exterior configuration and thermal output of 75 W, for demonstrating the heat generation in the compressor 26, a hollow cylindrical housing for accommodating the heater unit 112 and a pressure gauge 118 for detecting the pressure in the housing. A plurality of air nozzles 116, in particular twenty-eight (28) nozzles 116, for directing cooling air perpendicularly to the outer surface of the heater unit 112, are disposed in the side wall of the housing 114.

In the conduit 112 between the dummy heater unit 110 and the vacuum pump 120, a valve 124 and a flowmeter 126, for controlling and measuring the flow rate of the air through the conduit 122, are provided. The experimental apparatus 100 further includes temperature sensors (not shown) for detecting the temperature difference between the outer surface of the heater unit 112 and the room temperature. When the vacuum pump 120 draws the air in the housing 114, the air flow through the nozzles 116 impinges perpendicularly on the outer surface of the heater unit 112 to cool it.

Figure 4:
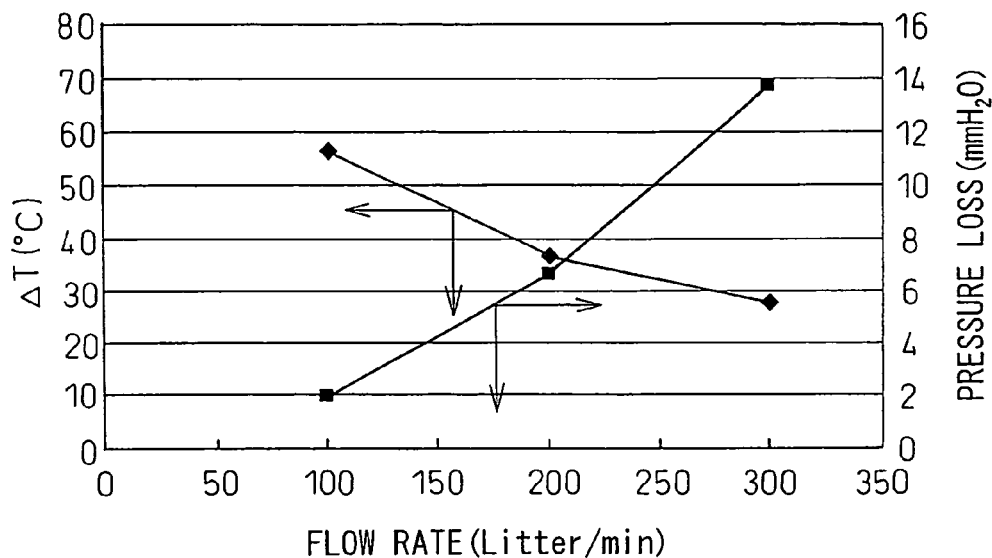
FIG. 4 is a graph showing experimental results obtained by using the apparatus of FIG. 3.

FIG. 4 shows the changes in the temperature of the outer surface of the heater unit 112 and the pressure loss through the nozzles 116 relative to the changes in the air flow rate. In this connection, please note that temperature of the outer surface of the heater unit 112 is indicated by the temperature difference $\Delta T$ between the outer surface of the heater unit 112 and the room temperature. As shown in FIG. 4, the larger the air flow, the more the heater unit 112 is cooled, and the greater the pressure loss through the nozzles 116.

Figure 5:
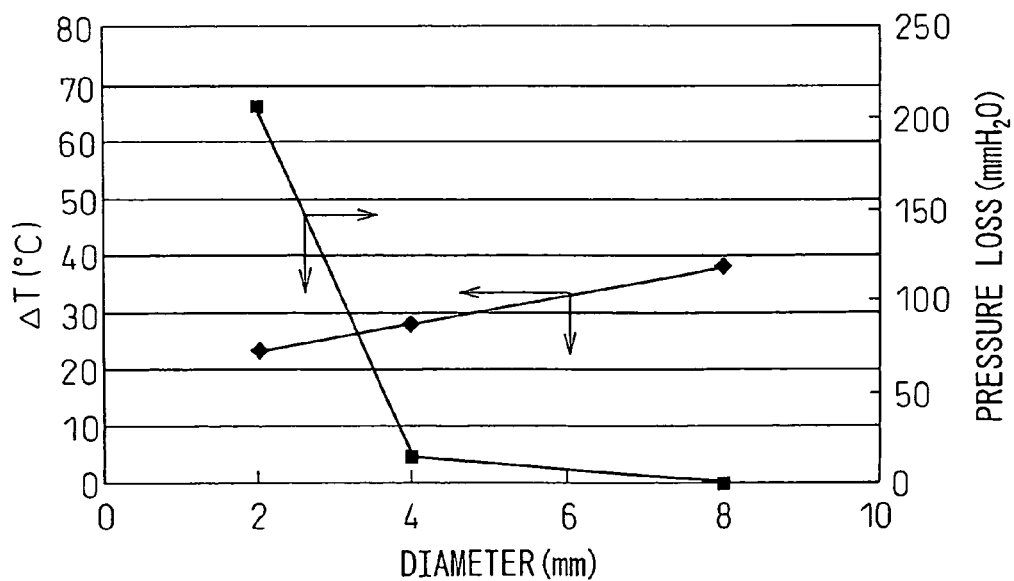
FIG. 5 is a graph showing other experimental results obtained by using the apparatus of FIG. 3.

FIG. 5 shows the changes in the temperature of the outer surface of the heater unit 112 and the pressure loss through the nozzles 116 relative to the diameter of the nozzles 116. The detailed experimental data in relation to the graph of FIG. 5 are shown in Table 1 below.

TABLE 1

| Dn (mm) | F (litter/min) | Ta (° C.) | Ts (° C.) | $\Delta T$ (° C.) | $\Delta P$ (mmH$_2$O) | V (m/sec) | Re |
|---|---|---|---|---|---|---|---|
| 2 | 290 | 21.7 | 44.9 | 23.3 | 207.1 | 55.0 | 6108 |
| 4 | 300 | 22.4 | 50.3 | 27.9 | 13.8 | 14.2 | 3159 |
| 6 | 397 | 22.0 | 60.0 | 38.0 | 1.0 | 3.5 | 1564 | where
Dn: diameter of the nozzles
F: Air flow rate through the nozzles
Tr: room temperature
Ts: temperature of the outer surface of the heater unit 112
$\Delta T$: Ts − Tr
$\Delta P$: pressure loss through the nozzles
V: flow velocity of the air through the nozzles
Re: Reynolds number As shown in FIG. 5 and Table 1, when the flow velocity of the air is larger than 15 m/sec, the pressure loss through the nozzles 116 rapidly and extremely increases. Therefore, according to the invention, diameter of the air inlet ports 28a and the flow rate of the cooling air therethrough are selected so that the flow velocity of the air flow through the air inlet ports 28a is lower than 15 m/sec. If the air inlet ports 28a comprise different size ports, the diameter is estimated by the average of the size of each of the ports.

The compressor 26 is cooled by the air induced by the cooling fan 30. The cooling air flow is selected so that the temperature difference $\Delta T$ between the temperature Ts of the outer surfaces of the cylinders 26a of the compressor 26 and the room temperature Tr is kept lower than 30° C. As is well known in the art, the higher the power of the compressor, the larger the required flow rate of the cooling air.

Figure 6:
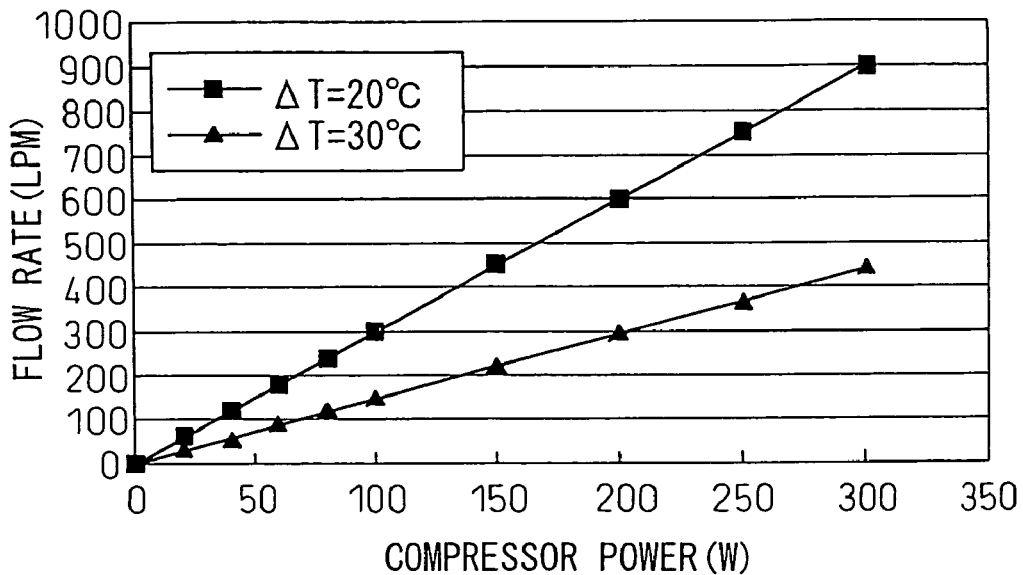
FIG. 6 is a graph showing other experimental results obtained by using the apparatus of FIG. 3.

FIG. 6 shows that there are linear relations between the changes in the power of the compressor and the changes in the flow rate of the cooling air required to maintain the temperature difference $\Delta T$ lower than a predetermined value. Two particular cases are shown in FIG. 6, one being a case of a temperature difference $\Delta T$ lower than 30° C., indicated by line-and-triangle mark, and the other being a case of a temperature difference $\Delta T$ lower than 20° C., indicated by line-and-square mark.

Figure 7:
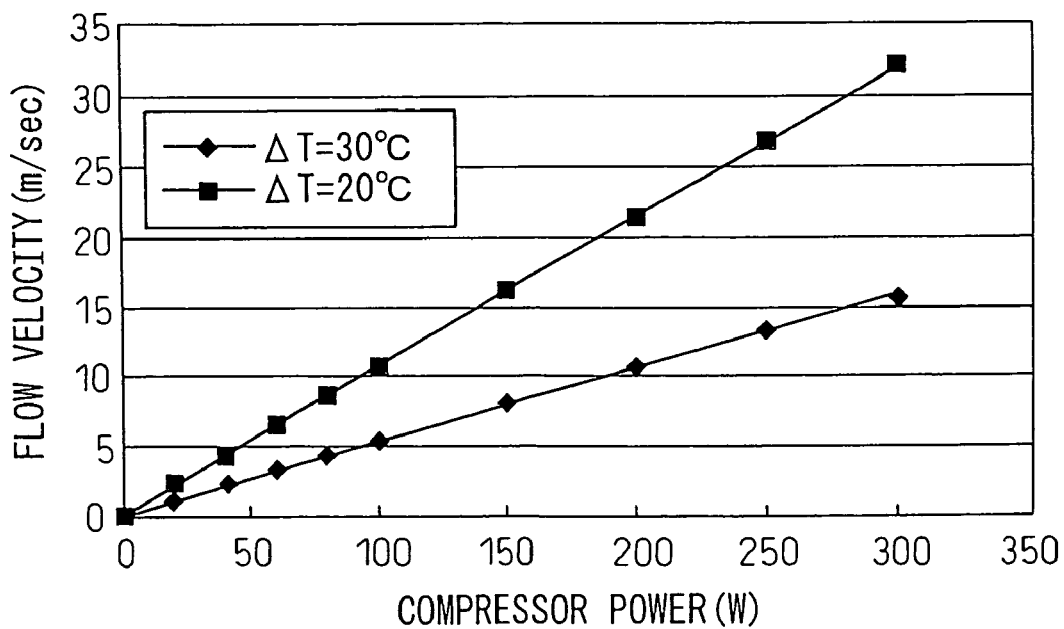
FIG. 7 is a graph showing other experimental results obtained by using the apparatus of FIG. 3.

FIG. 7 shows that there are linear relations between the changes in the power of the compressor and the changes in the flow velocity of the cooling air through the nozzles 116 required to maintain the temperature difference $\Delta T$ lower than a predetermined value. Two particular cases are shown in FIG. 7, one being a case of a temperature difference $\Delta T$ lower than 30° C., indicated by line-and-diamond mark, and the other being a case of a temperature difference $\Delta T$ lower than 20° C., indicated by line-and-square mark.

With reference to FIG. 7, the cooling air at 15 m/sec maintains the temperature difference $\Delta T$ at 30° C., with a compressor of 280 W, and at 20° C., with a compressor of 140 W, and therefore, can sufficiently cool a compressor which is commonly used for an oxygen concentrating apparatus. These experimental results provide parameters of 0.05 m/sec W ($\Delta T=30°$ C.) and 0.1 m/sec W ($\Delta T=20°$ C.), the flow velocity of the cooling air relative to the power of the compressor.

As described above, the pressure loss becomes excessively high when the velocity of air flow through the nozzles 116 is higher than 15 m/sec. On the other hand, sufficient cooling of the compressor allows it to operate for long time. Further, in order to provide a large amount of cooling air, a large cooling fan is required, which will result in increase in the volume, weight, noise and power consumption of the apparatus.

Therefore, in order fulfill these conditions, according to the invention, the velocity of the cooling air relative to the power of the compressor is selected to be, or to be larger than, 0.05 m/sec W, preferably in a range of 0.05 m/sec W-0.1 m/sec W. When a 100 W compressor is used, the diameter of the air inlet ports 28 is selected so that the velocity of the cooling air through the air inlet port 28 falls in a range of 5-15 m/sec and, preferably, in a range of 5-10 m/sec.

The invention claimed is:

1. An oxygen concentrating apparatus, comprising:
   an oxygen concentrating unit, including an adsorption column filed with an adsorbent material which selectively adsorbs nitrogen gas more than oxygen gas;
   a compressor for supplying compressed air to the oxygen concentrating unit;
   a compressor housing for accommodating the compressor, the compressor housing including a plurality of air inlet ports for introducing the air into the compressor housing and an air outlet opening for discharging the air from the compressor housing;
   a cooling fan mounted on the compressor housing at the air outlet opening for drawing the air from the compressor housing; and
   the air inlet ports being disposed adjacent the side wall of the compressor to direct the air flow induced by the cooling fan perpendicularly to the side wall of the compressor;
   characterized in that the capacity of the cooling fan and the diameter of the air inlet ports are selected to ensure the velocity of the air flow through the air inlet ports is equal to or lower than 15 m/sec.

2. An oxygen concentrating apparatus according to claim 1, wherein the capacity of the cooling fan and the diameter of the air inlet ports are selected to ensure that the velocity of the air flow through the air inlet ports relative to the electric power consumption of the compressor is equal to or higher than 0.05 m/secW.

3. An oxygen concentrating apparatus according to claim 2, wherein the capacity of the cooling fan and the diameter of the air inlet ports are selected to ensure the velocity of the air flow through the air inlet ports relative to the electric power consumption of the compressor is equal to or lower than 0.1 m/secW.

4. An oxygen concentrating apparatus according to any one of the previous claims, wherein the capacity of the cooling fan is selected to ensure the temperature differences between the air outside of the compressor housing and the outer surface of the compressor is equal to or lower than 30° C.

5. An oxygen concentrating apparatus according to claim 1, wherein the compressor includes a cylinder within which a piston is slidably disposed, a crank shaft, a connecting rod for connecting the piston to the crank shaft, a cylinder head attached to the end of the cylinder and a diving motor, the output shaft of which is connected to the crank shaft so that the rotation of output shaft of the driving motor is transformed to the reciprocations of the pistons; and
   the air inlet ports are disposed around the cylinder to direct the air, induced by the cooling fan, through the air inlet ports perpendicularly to the outer surfaces of the cylinder adjacent the ends thereof where the temperature of the air in the cylinder is increased by the compression of the air.

* * * * *